(No Model.)
9 Sheets—Sheet 1.
F. A. ROE.
MACHINERY FOR MANUFACTURING SPRING HORSESHOES.
No. 265,705. Patented Oct. 10, 1882.
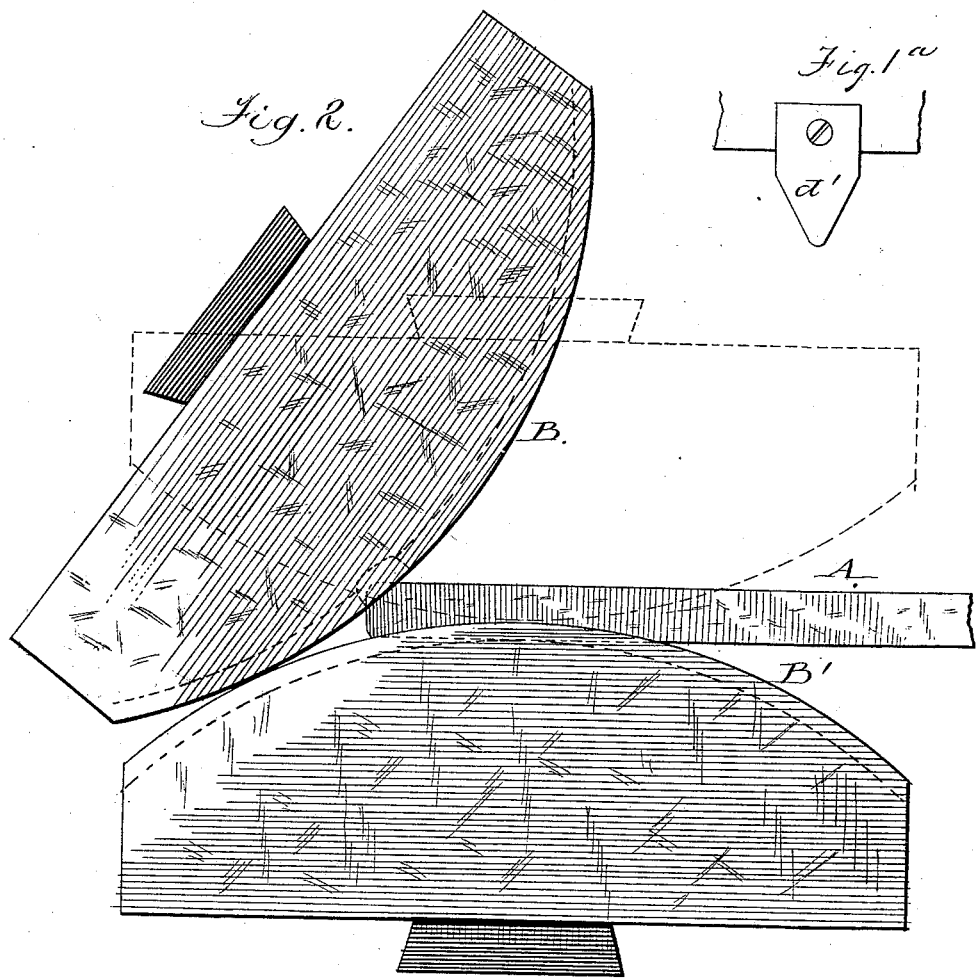
Witnesses:
Walter Fowler
H. B. Applewhaite
Inventor:
Frederick A. Roe
per attys.
A. V. Evans & Co.

(No Model.)  9 Sheets—Sheet 2.
F. A. ROE.
MACHINERY FOR MANUFACTURING SPRING HORSESHOES.
No. 265,705. Patented Oct. 10, 1882.
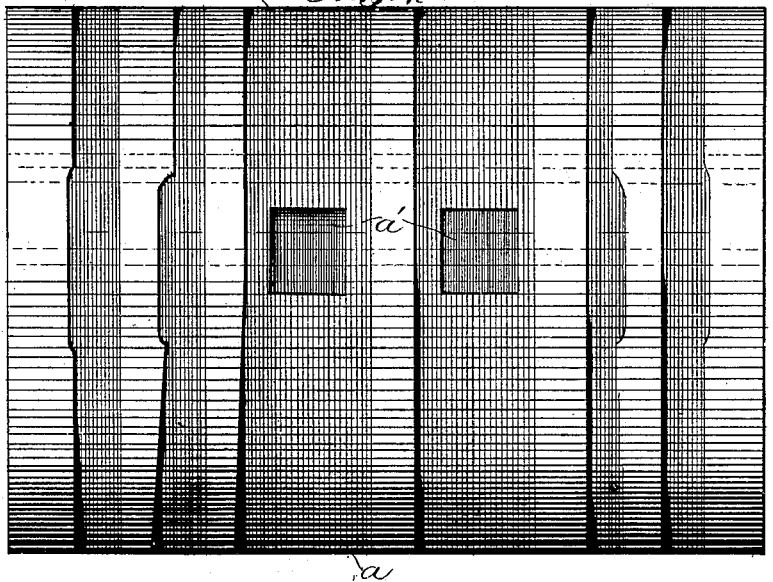
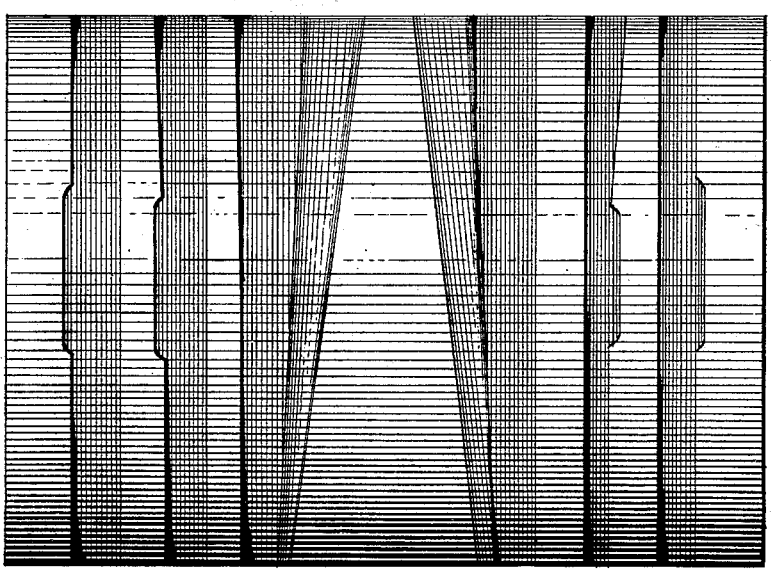
Witnesses:
Walter Fowler
H. B. Applewhaite
Inventor:
Frederick A. Roe
per attys.
A. H. Evans & Co.

(No Model.)

9 Sheets—Sheet 3.

F. A. ROE.
MACHINERY FOR MANUFACTURING SPRING HORSESHOES.

No. 265,705. Patented Oct. 10, 1882.

Witnesses;

B. Walter Fowler,
H. B. Applewhaite,

Inventor;

Frederick A. Roe
Per Attys
A. H. Evans & Co.

N. PETERS, Photo-Lithographer, Washington, D. C.

(No Model.)  
9 Sheets—Sheet 4.
F. A. ROE.
MACHINERY FOR MANUFACTURING SPRING HORSESHOES.
No. 265,705. Patented Oct. 10, 1882.
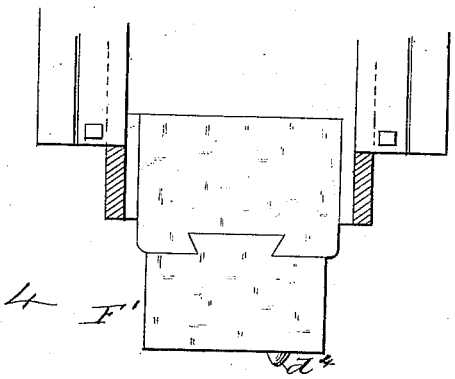
Fig. 4.
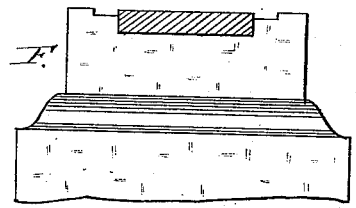
Fig. 5.
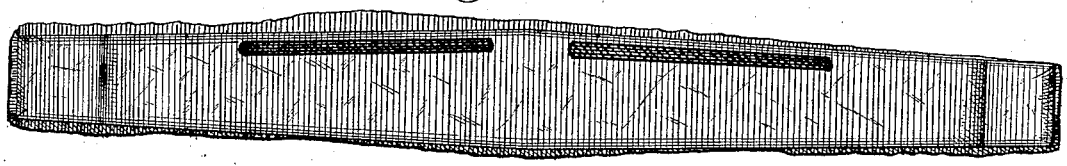
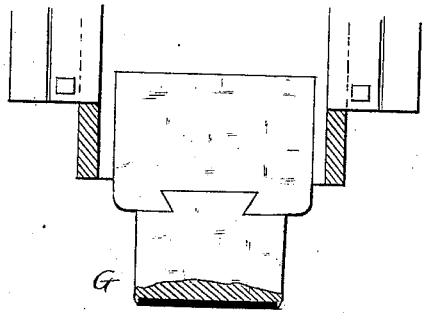
Fig. 6.
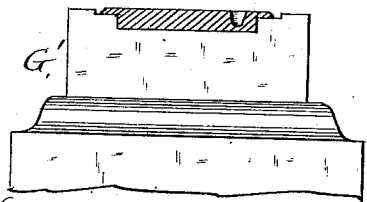
Witnesses;
Walter Fowler,
H. B. Applewhaite,
Inventor;
Frederick A. Roe
per Attys
A. H. Evans &c.

(No Model.)
9 Sheets—Sheet 5.
F. A. ROE.
MACHINERY FOR MANUFACTURING SPRING HORSESHOES.
No. 265,705.
Patented Oct. 10, 1882.
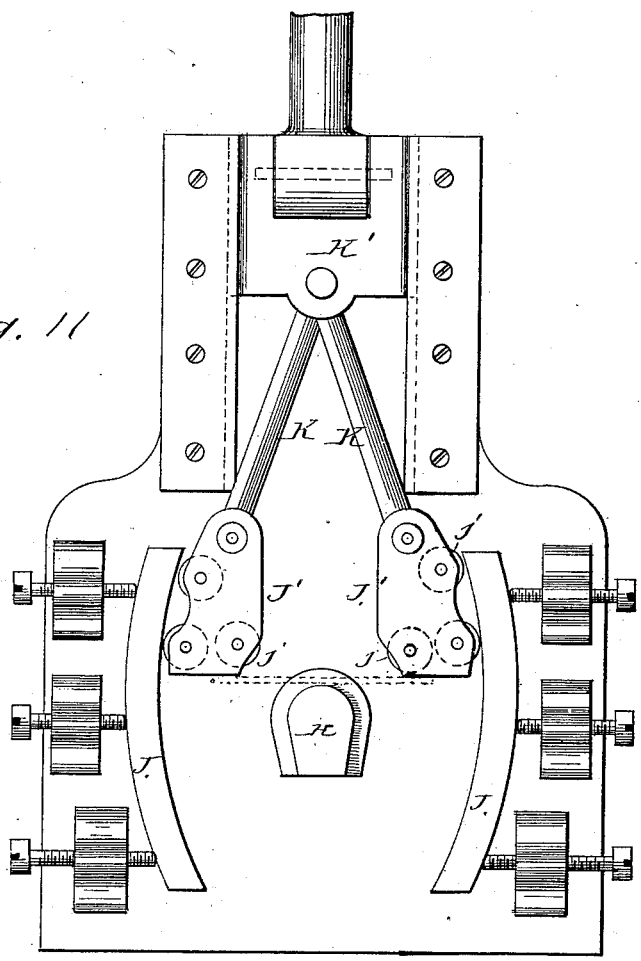

(No Model.) 9 Sheets—Sheet 6.
F. A. ROE.
MACHINERY FOR MANUFACTURING SPRING HORSESHOES.
No. 265,705. Patented Oct. 10, 1882.
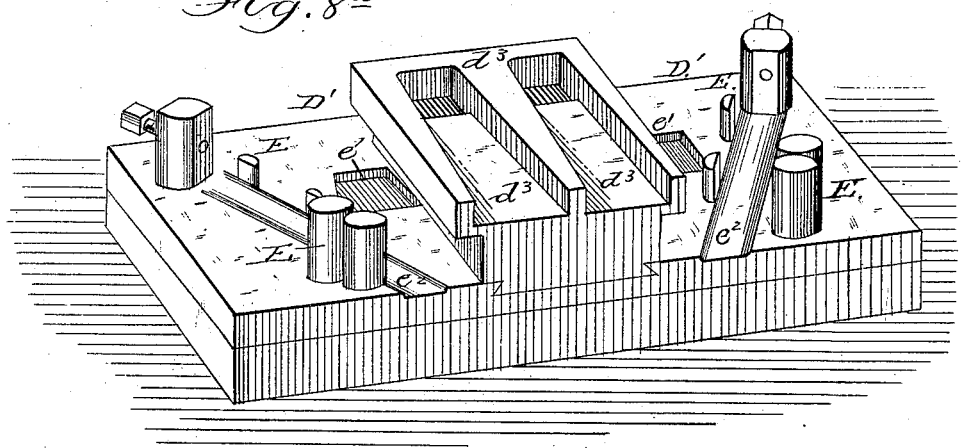
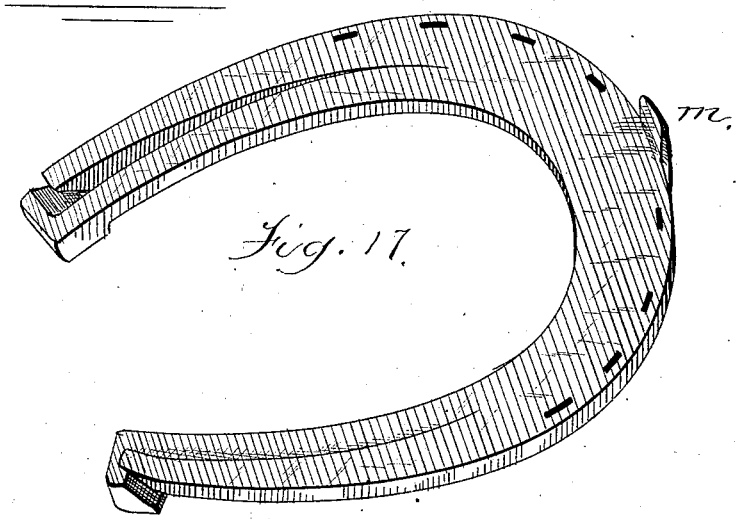
Witnesses;
Walter Fowler
H. B. Applewhaite
Inventor;
Frederick A. Roe
Per Attys
A. H. Evans & Co.

(No Model.) 9 Sheets—Sheet 7.
F. A. ROE.
MACHINERY FOR MANUFACTURING SPRING HORSESHOES.
No. 265,705. Patented Oct. 10, 1882.

Witnesses;
Walter Fowler
H. B. Applewhite

Inventor;
Frederick A. Roe
per atty
A. H. Evans & Co (No Model.) 9 Sheets—Sheet 8.
F. A. ROE.
MACHINERY FOR MANUFACTURING SPRING HORSESHOES.
No. 265,705. Patented Oct. 10, 1882.
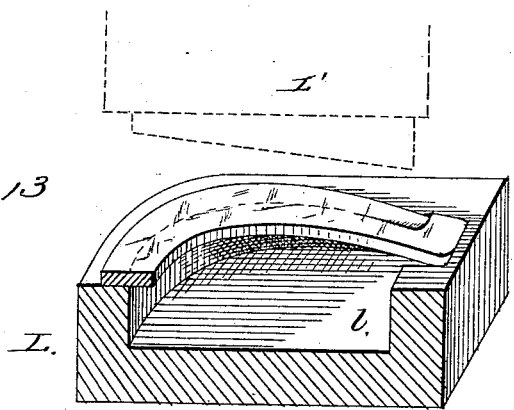
Fig. 13
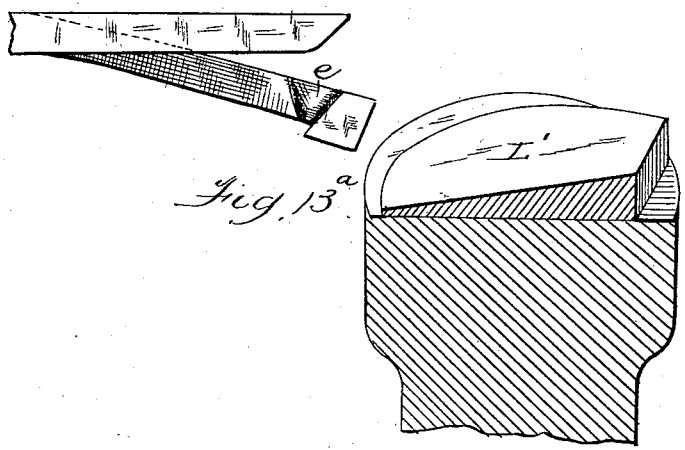
Fig. 15.ª
Fig. 13.ª
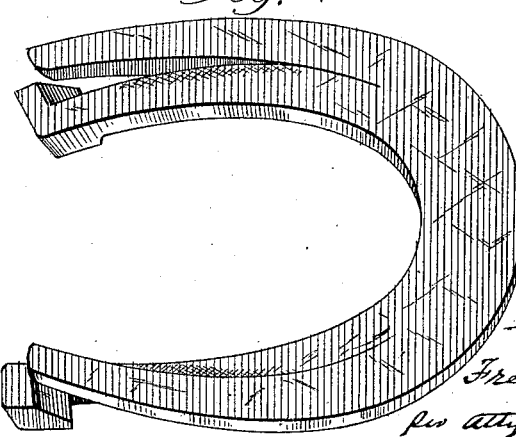
Fig. 14
Witnesses
Inventor:
Frederick A. Roe
per attys.
A. H. Evans & Co.

(No Model.)
9 Sheets—Sheet 9.
F. A. ROE.
MACHINERY FOR MANUFACTURING SPRING HORSESHOES.
No. 265,705.
Patented Oct. 10, 1882.
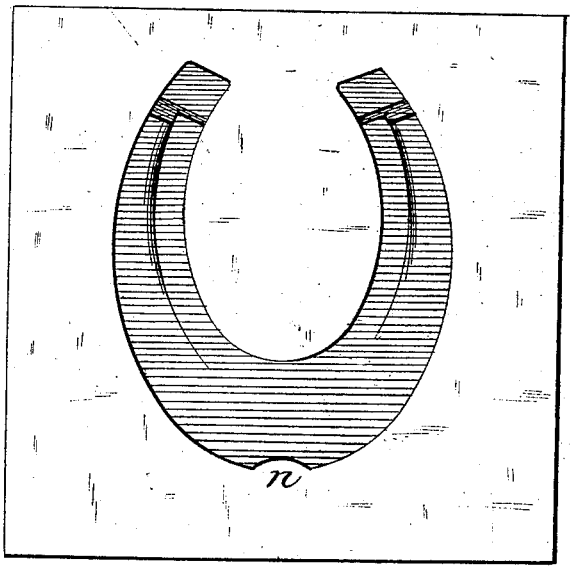
Fig. 16.
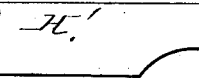
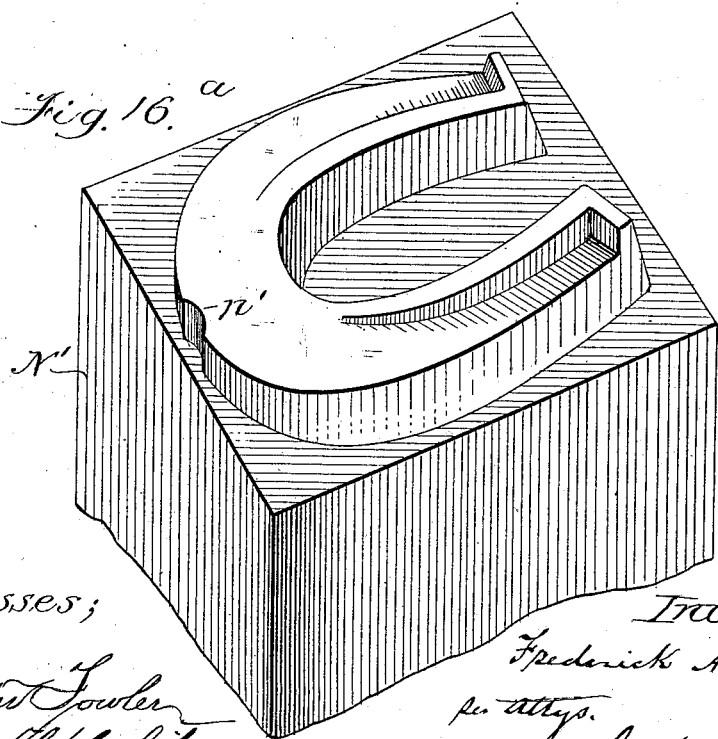
Fig. 16.ª
Witnesses;
H. Walter Fowler
H. B. Applenheit
Inventor.
Frederick A. Roe
per attys.
A. H. Evans & Co

UNITED STATES PATENT OFFICE.

FREDERICK A. ROE, OF NEW YORK, N. Y.

MACHINERY FOR MANUFACTURING SPRING-HORSESHOES.

SPECIFICATION forming part of Letters Patent No. 265,705, dated October 10, 1882.

Application filed March 11, 1882. (No model.)

*To all whom it may concern:*

Be it known that I, FREDERICK A. ROE, of the city and county of New York, have invented certain new and useful Improvements in Machinery for the Manufacture of Spring-Horseshoes, of which the following is a clear, full, and exact description, reference being had to the accompanying drawings, making a part of this specification, in which—

Figure 3:
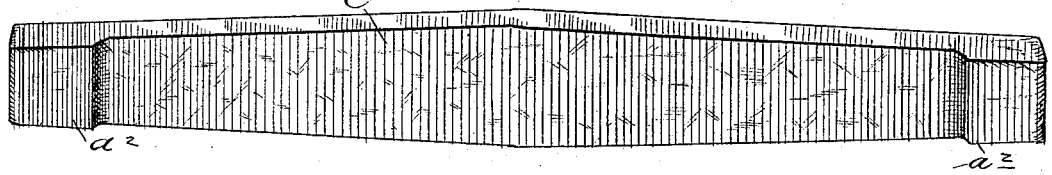
Figure 8:
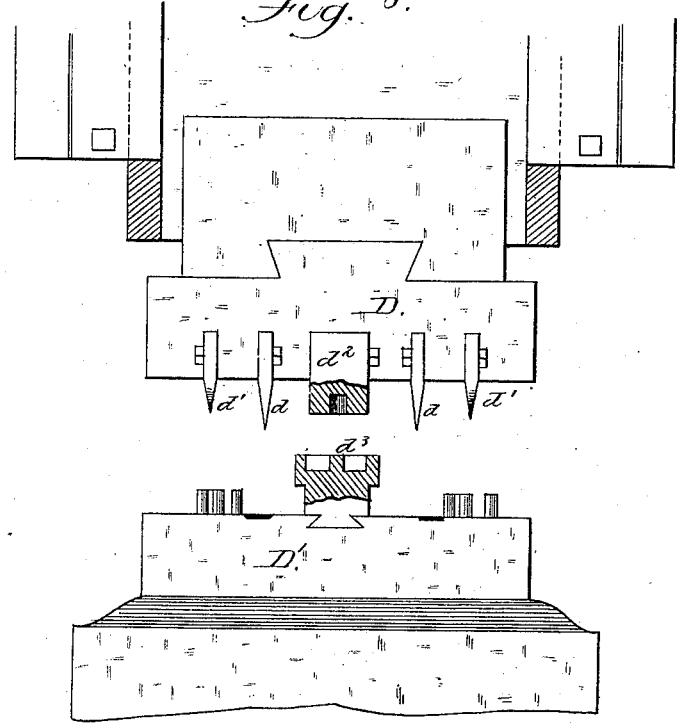
Figure 9:
Figure 10:
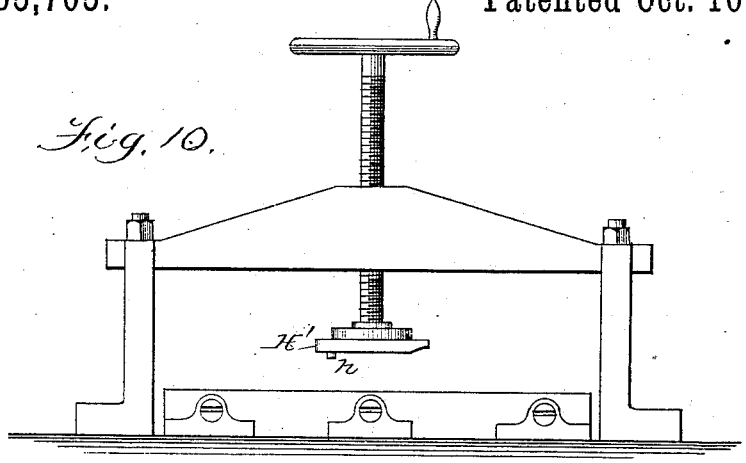
Figure 12:
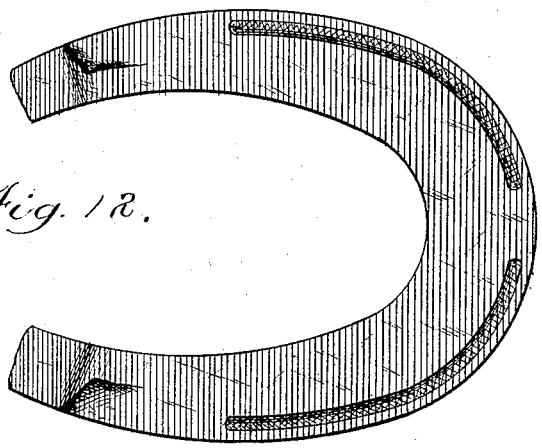
Figure 15:
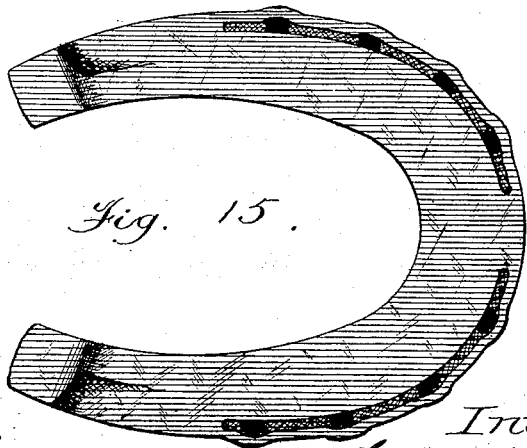

Figure 1 shows a blank cut from the metal bar. Fig. 1$^a$ shows the V-shaped blade. Figs. 2, 2$^a$, and 2$^{a\prime}$ show the dies for drawing the blanks and producing the heels. Fig. 3 is a view of the blank as drawn. Fig. 4 shows the dies for creasing the blank and making it uniform. Fig. 5 is a view of the blank after it has been creased. Fig. 6 shows the die for trimming the fin from the blank left after creasing and being made uniform. Fig. 7 is a view of the blank trimmed. Figs. 8 and 8$^a$ show the dies and knives for cutting the rear of the shoe to form the heel portion of the spring. Fig. 9 is a view of the blank showing these cuts. Fig. 10 shows a machine for bending the blank, with my improvements attached. Fig. 11 shows a plan view of the bed. Fig. 12 is a view of the shoe bent. Figs. 13 and 13$^a$ show the dies for completing the cutting of the spring. Fig. 14 is a view of the shoe with the spring completely cut. Fig. 15 shows the same after the holes have been punched. Fig. 15$^a$ shows the spring as cut by die L. Figs. 16 and 16$^a$ show the dies for finishing the shoe, setting the spring, and putting on the toe-clip. Fig. 17 shows a spring-horseshoe as completed by my improved machinery.

My invention relates to machinery for economically manufacturing spring-horseshoes; and it consists in the novel dies and combination of devices, hereinafter explained and claimed, whereby I am enabled to place the improved spring-shoe upon the market at a price not much exceeding that of the ordinary shoe.

To enable others skilled in the art to make and use my invention, I will proceed to describe the exact manner in which I have carried it out.

From the ordinary bar of metal I cut the blank A of the desired length to form a shoe, and this blank, after being properly heated, is subjected to the dies B B'. These dies have their curved surfaces grooved, as shown in Fig. 2, the groove $a$ being provided with a recess, $a'$, for forming the calk $a^2$ on the heel of the shoe-blank; or the shoe may be made without a calk on the heel. The other grooves receive the blanks edgewise and give the form to blank C, as shown in Fig. 3. Only one half of the length of the blank is pressed into shape at a time. The blank is then turned with the other end to the dies and the other half presented to the corresponding grooves on the opposite side of the die, so as to form each end of the blank to suit the right and left sides of the shoe. The blank, after being thus drawn and the calk formed, is subjected to the dies D D' for cutting the ends of the blank to form the rear of the spring. In order to make the rear of the spring on an incline or beveled, so as to rest against the heel of the shoe proper when forced against the shoe, it is necessary to first cut the shoe on the proper incline, as shown at $e$, Fig. 15$^a$, to prevent the metal from tearing or breaking when the spring is cut. This I accomplish by means of the dies D D', provided with the V-shaped blades $d\, d$, as shown in Fig. 1$^a$, and the straight-edged blades $d'\, d'$, secured to the upper die D. The upper die D also carries a plunger, $d^2$, which fits into the recessed block $d^3$ in the lower die D'. On each side of the block $d^3$ is a recess, $e'$, in the die, for the reception of the calk of the blank when the blank is laid flat on the die to receive the V-shaped blade, which penetrates the blank just in front of the calk or heel, as shown at $e$ in Fig. 15$^a$. After this V-shaped cut is made through the blank the blank is turned edge upward against the guide-pins E and in the groove $e^2$ to receive a cut from the straight-edge blade $d'$. As the blade $d'$ stands at right angles to the front of the die-block D' and the guide-pins and groove $e^2$ stand at a desired angle, it is evident that the edge of the blank will be cut on an angle, as shown in Fig. 9, the angle corresponding to the angle of the cut made by the V-shaped blade, and the heel of the spring is thus separated from the shoe proper, and with the proper lap, as desired. It is also evident that the angle of the cut must be reversed on the two ends of the blank, and this is accomplished by cutting one against each line of the guide-pins, as this reverses the position of the blank and necessarily the angle of the cut. After the metal has been thus severed at the point of the spring the blank is placed in the recessed block $d^3$ in the die D' and the plunger $d^2$ brought down on it to restore the parts of the severed metal back to their original relative position, so as not to interfere with the subsequent manipulation of the blank. The shape of the cut made by the V-shaped blade is shown at $e$ in Fig. 15$^a$. The blank, after being thus cut at the ends, is subjected, one end at a time, to the dies F F' for forming the crease in the blank and for reducing the blank to exact form. These dies are subjected to the operation of a drop-hammer, which forces the ribs $d^4$, secured to the upper die F', into the metal to form the crease. The ribs $d^4$ are attached to the upper die in order that they may be exposed as little as possible to the effects of heat, which would have a tendency to burn and soon destroy them. As the hammer strikes and rises quickly from the heated metal, but little injury can result from the contact of the ribs $d^4$ with the hot metal. The blank being thus forced in between the dies F F', any surplus metal is necessarily crushed out in the form of a fin, as shown in Fig. 5. To remove this fin the blank is subjected to dies G G', which trim the fin from the blank and leave it as shown in Fig. 7. After the blank has been creased, reduced to exact form, and trimmed, it is next subjected to the bending-machine, Figs. 10 and 11. This machine has secured in the center of the platform or table a die, H, of the shape it is proposed to give to the shoe, and above this is a plate, H', operated by a screw and hand-wheel, or by any other well-known means, by which the plate is pressed down over the die H or raised up, as may be desired. On the lower face of the plate H' is inserted the spring-pin $h$, which, when the plate is brought down, rests directly on the shoe-blank and assists in holding it in position during the bending process.

On each side of the die H is secured an adjustable guide, J, between which move the formers J', provided with friction-rollers $j$, pressing against the guides, and the friction-rollers $j'$ to press against the shoe-blank while being bent around the die H. The formers J' are pivoted to the arms K, which are in turn pivoted to the block K'. This block can be operated by any of the well-known cam devices so as to cause the formers J' to move backward and forward on the table. When the blank has been properly heated it is laid transversely in front of and against the die H, and the plate H' is brought down to hold the blank from slipping while the formers J' move up and around the die and bend the blank to the desired form.

After the form has been given to the shoe the holes are punched, and then it is subjected to the dies L L', Fig. 13, for cutting the springs. The lower die L has an opening or recess, $l$, just large enough to receive the spring portion of the shoe, including the calk, while the upper die L' is made to fit this recess. The face of the die L' is so beveled that it strikes first on the heel of the shoe, and then cuts forward with a shearing cut as far as desired to sever the spring from the side of the shoe proper, as illustrated in Fig. 14. It now becomes necessary to set the spring, remove the irregularities caused by the punching of the holes, (see Fig. 15,) and to put on the toe-clip $m$. I accomplish this by means of the dies N N', the lower one, N, being recessed to receive the shoe, with the exception of a slight protuberance, $n$, in the recess at the point of the toe, as shown in Fig. 16. The upper die N' has a corresponding concavity, $n'$, and the result necessarily is that when the shoe is pressed into the die N by the die N' a small portion of the metal at the toe of the shoe is forced up into the cavity $n'$ by the protuberance $n$ and forms the clip $m$ at the same movement by which the springs are set and all irregularities removed from the shoe, which is then ready for tempering and packing for the market.

By my improved machinery I am thus enabled to make a spring-horseshoe as quickly and nearly as cheaply as the ordinary shoe now on the market.

I am aware that it is not broadly new to crease horseshoes by means of dies, as the same has been done by rolls provided with grooves and creasers, which will, by their joint operation, exert pressure in a lateral as well as in a longitudinal direction; but such is not my invention.

I am also aware that it is not new to bend horseshoes by means of a stationary die around which the shoe is formed, combined with grippers for holding the blank and a reciprocating carriage to which is attached, by swinging an arm, a pair of forming-rollers which are directed by fixed but adjustable guides; and hence I make no claim to this construction, broadly.

Having thus described my invention, what I claim as new, and desire to secure by Letters Patent, is—

1. The dies B B', having their surfaces curved and grooved, as shown and described, and provided with the recess $a$ for forming the calk of the shoe, substantially as herein set forth.

2. The die D, carrying the plunger $d^2$, and provided with blades $d$ $d'$, in combination with the die D', provided with the recessed block $d^3$, the recess $e'$, the guide-pins E, and the groove $e^2$, all constructed to operate substantially as and for the purpose described.

3. The stationary die F, recessed to receive the shoe-blank, in combination with the vertical drop-die F', provided with the ribs $d^4$, substantially as and for the purpose set forth.

4. In combination with a table provided with the die H, guides J, and formers J', provided with the friction-rollers $j\,j'$, the plate H', provided with the spring-pin $h$, substantially as and for the purpose set forth.

5. The die L, recessed to receive only the spring portion of the shoe, in combination with the die L', fitting said recess, and provided with a beveled face, substantially as and for the purpose herein described.

FREDERICK A. ROE.

Witnesses:
 THADDEUS DAVIDS, Jr.,
 FRANCIS G. BENT.